(12) United States Patent
Zhu et al.

(10) Patent No.: US 10,701,961 B2
(45) Date of Patent: Jul. 7, 2020

(54) ELECTRIC SPRAYING STERILIZATION AND PROTEIN PEPTIDE BOND CLEAVAGE DEVICE AND METHOD

(71) Applicant: ZHEJIANG HAOCHUANG BIOTECH CO., LTD., Zhejiang (CN)

(72) Inventors: Yixin Zhu, Zhejiang (CN); Tingting Lu, Zhejiang (CN); Linze Ge, Zhejiang (CN); Shengchun Wang, Zhejiang (CN)

(73) Assignee: ZHEJIANG HAOCHUANG BIOTECH CO. LTD., Zhejiang (CN)

( * ) Notice: Subject to any disclaimer, the term of this patent is extended or adjusted under 35 U.S.C. 154(b) by 531 days.

(21) Appl. No.: 15/331,341

(22) Filed: Oct. 21, 2016

(65) Prior Publication Data

US 2017/0112170 A1    Apr. 27, 2017

(30) Foreign Application Priority Data

Oct. 23, 2015   (CN) .................. 2015 2 08321392 U

(51) Int. Cl.
*H01J 49/16*   (2006.01)
*A23L 3/32*    (2006.01)

(52) U.S. Cl.
CPC ............. *A23L 3/32* (2013.01); *A23V 2002/00* (2013.01)

(58) Field of Classification Search
CPC ............. B01L 3/5027; B01L 3/502715; G01N 30/7266; H01J 49/165; H01J 49/0404; H01J 49/0445; H01J 49/167; B05B 5/025
See application file for complete search history.

(56) References Cited

U.S. PATENT DOCUMENTS

| | | |
|---|---|---|
| 2,510,796 A | 6/1950 | Brown |
| 5,447,733 A | 9/1995 | Bushnell et al. |
| 5,690,978 A | 11/1997 | Yin et al. |
| 6,086,932 A | 7/2000 | Gupta |
| 6,178,880 B1 | 1/2001 | Mastwijk et al. |
| 6,393,975 B2 | 5/2002 | Morshuis et al. |
| 8,651,015 B2 | 2/2014 | Zhu et al. |

FOREIGN PATENT DOCUMENTS

CN    102224970 A    10/2011

*Primary Examiner* — Jill A Warden
*Assistant Examiner* — Dwayne K Handy
(74) *Attorney, Agent, or Firm* — BainwoodHuang

(57) ABSTRACT

An electric spraying device includes a spray emitter made of electrically conductive material, an electrode container made of electrically conductive material, and a voltage source. The electrode container has an opening at an upper end thereof, and the voltage source has a first pole electrically coupled to the spray emitter and a second pole electrically coupled to the electrode container. The spray emitter has an exit end disposed at or within the opening of the electrode container. The exit end of the spray emitter has a surface with a set of projections extending therefrom, and the set of projections are configured to form a concentrated electric field in response to an applied voltage from the voltage source between the first pole and the second pole. The spray emitter is constructed and arranged to conduct liquid along the surface to the set of projections, so as to polarize the liquid under the concentrated electric field and to dispense the liquid into the electrode container.

20 Claims, 4 Drawing Sheets

ELECTRIC SPRAYING STERILIZATION AND PROTEIN PEPTIDE BOND CLEAVAGE DEVICE AND METHOD

CROSS-REFERENCES TO RELATED APPLICATIONS

This application claims the benefit of Chinese Patent Application No. 2015/208321392, filed Oct. 23, 2015, the contents and teachings of which are incorporate herein by reference in their entirety.

BACKGROUND

1. Field of the Invention

The present invention relates generally to liquid food sterilization, and more specifically to a new electric spraying sterilization and protein peptide bond cleavage device.

2. Description of the Related Art

Known approaches for sterilizing materials apply high intensity pulsed electric fields (PEF) to liquids to cause bacteria in the liquids to electroporate and consequently inactivate. As PEF technology requires high intensity pulsed electric voltages, it inevitably involves high energy consumption, high technical requirements for equipment, and risk factors associated with high voltage. More critically, PEF technology fails to ensure uniform electric field intensity for liquids of diverse physical and chemical parameters. When used to sterilize liquid food products, PEF technology can produce unstable and unreliable sterilizing effects.

Chinese patent document CN102224970A discloses an electrospraying sterilization device which is not influenced by the physical and chemical parameters of the liquid. The device includes an electrical source. When a liquid carrying bacteria flows through a voltage connector sleeve, the liquid conducts high voltage to an outlet of a hollow capillary emitter, where bacteria are gradually polarized based on their own electrical and chemical properties. Generally, electric current does not cause bacteria to be killed directly in the voltage connector sleeve. Rather, it is mainly that the bacteria with molecular polarity flow with the liquid. As the liquid passes to the outlet of the hollow capillary emitter, the liquid forms a dynamic Taylor cone under the electric field force. The radius of curvature of the outlet is small enough to be counted on sub-micron level, so that the surface electric field action on the liquid is strong enough to fully polarize the microbial cells with polarity and to thoroughly disrupt them, thereby achieving the sterilizing effect.

SUMMARY

Unfortunately, the inner diameter of the outlet end of the hollow capillary emitter is small, such that the amount of liquid that can be processed per unit time is small. Therefore, the prior electrospraying approach is not suitable for treating large quantities of liquid within reasonable periods of time.

In contrast with prior approaches, some embodiments are directed to an electric spraying device that includes a spray emitter made of electrically conductive material, an electrode container made of electrically conductive material, and a voltage source. The electrode container has an opening at an upper end thereof, and the voltage source has a first pole electrically coupled to the spray emitter and a second pole electrically coupled to the electrode container. The spray emitter has an exit end disposed at or within the opening of the electrode container. The exit end of the spray emitter has a surface with a set of projections extending therefrom, and the set of projections are configured to form a concentrated electric field in response to an applied voltage from the voltage source between the first pole and the second pole. The spray emitter is constructed and arranged to conduct liquid along the surface to the set of projections, so as to polarize the liquid under the concentrated electric field and to dispense the liquid into the electrode container.

Other embodiments are directed to a method for using the electric spraying device to sterilize liquids and/or to cleave protein peptide bonds.

The foregoing summary is presented for illustrative purposes to assist the reader in readily grasping example features presented herein; however, it is not intended to set forth required elements or to limit embodiments hereof in any way.

BRIEF DESCRIPTION OF THE SEVERAL VIEWS OF THE DRAWINGS

A further understanding of the present invention can be obtained by reference to a preferred embodiment set forth in the illustrations of the accompanying drawings, in which like numbers refer to like elements throughout. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention. For a more complete understanding of the present invention, reference is now made to the following drawings in which:

DETAILED DESCRIPTION OF THE INVENTION

Figure 1:
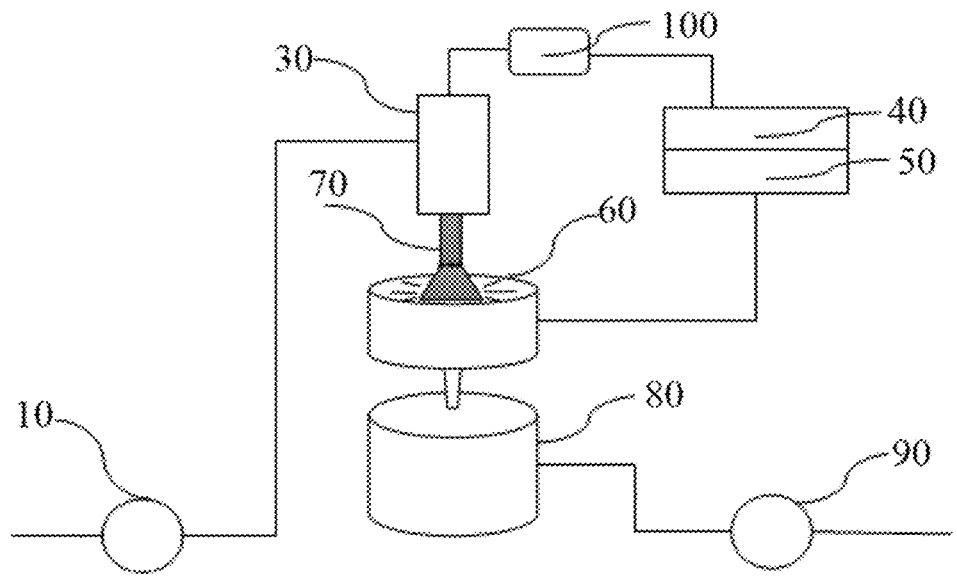
FIG. 1 is a structural schematic diagram of example embodiments of the present invention.

Embodiments of the invention will now be described. It should be appreciated that such embodiments are provided by way of example to illustrate certain features and principles of the invention but that the invention hereof is not limited to the particular embodiments described.

Overview of Embodiments

Embodiments of the present invention provide techniques for electric spraying sterilization and protein peptide bond cleavage. Such embodiments provide the advantages of complete sterilization, large processing amount, suitability for industrial application, simple structure, and convenient operation.

Embodiments of the present invention are realized through the following technical scheme and implementation. An electric spraying sterilization and protein peptide bond cleavage device includes an electric voltage device and a feeding apparatus, wherein one pole (e.g., the anode or cathode) of the electric voltage connects with the electrode container via a cable, while the other pole connects with an atomization device via a cable. The atomization device is connected with a spray emitter made of conductive materials whose outlet is configured to dispense sterilized liquid into the electrode container. The atomization device may be provided as an ultrasonic atomizer, a pneumatic atomizer, or an electric motor atomizer, for example. The spray emitter may be provided as a column shaped multi-layer spray emitter or a trumpet type spray emitter, where the trumpet type spray emitter may be composed of a hollow cylinder form and a trumpet-shaped portion which is connected with the hollow cylinder. The feeding apparatus is linked to the atomization device. Liquid flows into the atomization device and flows out along a surface of the spray emitter. In some examples, a multi feeder is placed outside of the spray emitter, and the multi feeder is connected with the feeding apparatus. Liquid is sprayed to the spray emitter through the multi feeder. An electric field force is created between a Taylor cone formed by the liquid ejected from the spray emitter and the electrode container. The column shaped multi-layer spray emitter includes a cylinder, which is connected with the atomization device, and a surface of the cylinder has a plurality of multi-layer parallel annular projections.

The electric voltage device acts as an electrical source, so that liquid carrying bacteria are affected by the high voltage and ultrasonic effect to release a myriad of Taylor cones. As the electric field is larger than the binding energy of the positive and negative ions in the bacterial cells, the cells can be torn directly to achieve the effect of sterilization. Generally, the ultrasonic effect by itself will not cause bacteria to be killed directly in ultrasonic atomization. Rather, as liquid containing bacteria with molecular polarity is subject to ultrasonic atomizer vibration, the liquid disperses into fine particles, such that the liquid forms numerous continuous dynamic Taylor cones under the electric field force. The radius of curvature is small enough to be counted on the sub-micron level so that the surface electric field action on the liquid is strong enough to fully polarize the microbial cells, thoroughly disrupting them to achieve the effect of sterilizing, and cutting off the peptide bond of some proteins in the liquid. An electric motor or pneumatic atomizer can produce the same effect of atomization as an ultrasonic nebulizer.

Further, the electrode container is made of a metal material having an opening at one end and a liquid outlet at the other end. The shape of the electrode container may be cylindrical, hemispherical, conical, spherical, or ellipsoidal, for example. The liquid outlet end of the electrode container is connected to a transfer container which further connects with a discharge pump by a pipe. The inside surface of the transfer container is made of metal material, which is connected to an electrical ground with a grounding wire.

Preferably, the atomization device is provided with a liquid inlet and a liquid outlet which connects to the hollow cylinder. The connection point of the hollow cylinder and the trumpet-shaped portion is a closed bottom surface. There are multiple liquid outlet holes around the side surface of the hollow cylinder body which are located close to the closed bottom surface. The closed bottom surface and the liquid outlet holes can be arranged so that the liquid can flow through the outlet holes to the outside of the hollow cylinder and along the horn body surface of the trumpet type spray emitter, with the liquid being continuously atomized in the process of flowing.

As a better choice, the liquid outlet holes are evenly distributed around the side of the hollow cylinder. When liquid flows out of the liquid outlet holes of the hollow cylinder, the structure design of the trumpet type spray emitter can ensure liquid distribution is more uniform, achieving a better and more complete atomization effect, which is more likely to form stable Taylor cones.

Preferably, there are multiple parallel annular blade ports arranged at the bottom of the trumpet-shaped portion of the trumpet type spray emitter. These structures have sharp tips and are able to achieve high electric field strength as the tips receive high voltage from the atomization device.

Preferably, a surface of the electrode container is coated with a composite insulating layer, which can improve the utilization rate of liquid and promote safety for the operator during equipment use.

In some examples, the feeding apparatus includes a feed pump. The outlet of the feed pump is connected to the atomization device through a pipe, which is designed to help realize the overall sterilizing operation.

In some examples, the feeding apparatus includes a feed pump. The multi feeder is connected to the feed pump through a pipe.

In some examples, the feeding apparatus includes a feed pump and a circulating pump. The multi feeder is connected to the circulating pump by a pipe, the circulating pump is connected to the transfer container by a pipe, and the transfer container is connected to the feed pump by a pipe, all of which are designed to ensure the effectiveness of the whole sterilization.

In some examples, the feeding apparatus includes a feed pump and a circulating pump. The transfer container is connected to the feed pump by a pipe, the atomization device is connected to the circulating pump by a pipe, and the circulating pump is connected to the transfer container by a pipe.

Preferably, the multi feeder is provided with an annular duct. The surface of the multi feeder is arranged with 2~20 water channels, which are communicated with the annular duct. The water channels are uniformly arranged along a circumference of the multi feeder surface, whose included angle A formed with the annular duct is 0~120 degrees, for example. In an example, the feed pump 10 or the circulating pump 20 may introduce liquid into the annular duct of the multi feeder, and the liquid flows through the water channels to the spray emitter, where the liquid is dispersed along the surface of the spray emitter and emitted, under the influence of the electric field, into the electrode container.

Preferably, the electric voltage device sends pulsed voltage, random pulsed voltage, one-way sine wave voltage, one-way non-sinusoidal wave voltage, or DC (direct current) voltage, with voltage values at 10V (volt)~100 KV (kilovolts), e.g., under direction of a control device. The voltage hereof may have a wide range in use, and sterilization can be realized as long as voltage is sufficient to cause the bacteria to be electrified and polarized.

As a better choice, the voltage value of the electric voltage device is 10 KV~50 KV. The control device is preferably an intelligent one which may provide various voltage functions depending on liquid flow, bacteria concentration, and physical and chemical parameters of the liquid. The voltage functions are not intended to impact the sterilizing effect in theory or in practice, but rather serve to make the device work better depending on physical and chemical parameters of the liquid. The intelligent control device can also establish a cycle of sterilization time, e.g., to control circulating sterilization processes intelligently. Moreover, in view of actual voltage in use, e.g., in the range of 10 KV~50 KV, good sterilizing effect can be achieved even without additional functions.

Preferably, there is an isolation transformer equipped on the connecting line of the voltage device and the atomization device, which helps to filter applied voltage and protect personnel.

Preferably, the metal of the spray emitter and the electrode container are each coated with a sanitary nanometer non-stick coating material, which helps to ensure that the electric power of the voltage device can be transmitted to the treated liquid. In addition, the coating on the spray emitter helps to prevent liquid droplets from condensing and coalescing.

Furthermore, the electrode container, transfer containers, spray emitter, and pipeline equipment are preferably disinfected and sterilized on a regular basis, e.g., using physical and/or thermal techniques. In addition, the pipeline equipment and/or external multi feeder may be replaced regularly, to help promote the effectiveness of liquid sterilization.

Compared with existing technology, embodiments of the present invention have the following advantages and effects:

1. Embodiments of the present invention apply Taylor cone techniques previously used in the field of electric spray ionization to the field of liquid food sterilization, producing a sterilization effect that is extremely thorough. Benefits far exceed expectations, including effects on preserving the nutritional components of the food, especially for foods unsuitable for high temperature or high pressure treatment.
2. Embodiments of the present invention overcome the limitations of slow flow rate when using a single Taylor cone. As atomization technology is used to spray a liquid into a large number of droplets within 100 microns, the electric field force causes countless Taylor cones to be created. The radius of curvature is small enough to be counted on the sub-micron level so that the surface electric field action on the liquid is strong enough to fully polarize the microbial cells with polarity, thoroughly disrupting them to achieve the effect of sterilizing, and cutting off the peptide bond of some proteins in liquid.
3. The use of the hollow cylinder in the trumpet type spray emitter and/or the water channel on the multi feeder surface replace the capillary hollow emitter in patent document CN102224970A, greatly improving the amount of liquid that can be processed per a unit time.
4. Embodiments of the present invention feature simple structure and easy operation, with better and more thorough sterilization effects, and they are suitable for industrial applications.

DESCRIPTION OF PARTICULAR EXAMPLE EMBODIMENTS

Example 1

Figure 5:
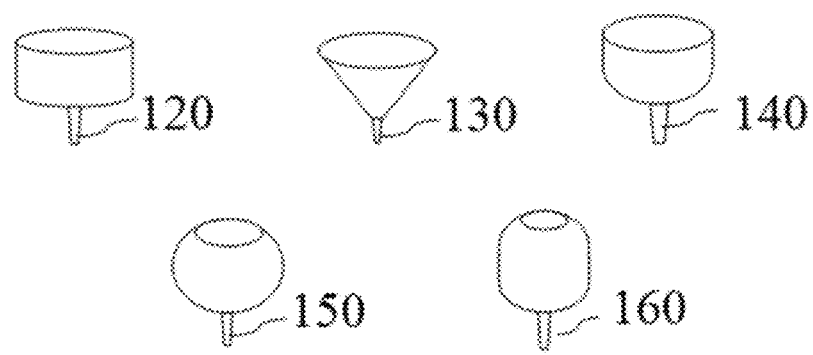
FIG. 5 is a structural schematic diagram of an electrode container used with certain embodiments of the present invention.
Figure 6:
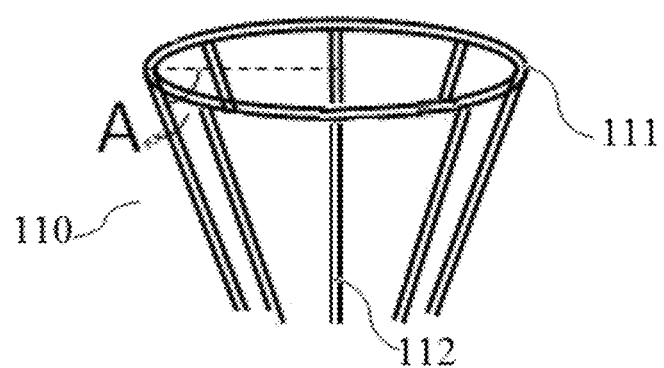
FIG. 6 is a structural schematic diagram of a multi feeder used with various embodiments of the present invention.
Figure 7:
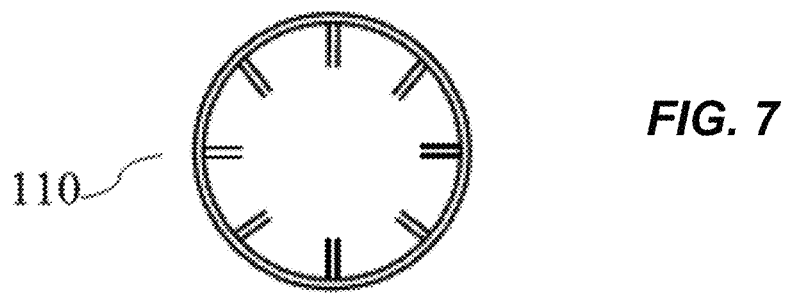
FIG. 7 is a vertical view of the multi feeder of FIG. 6.
Figure 8:
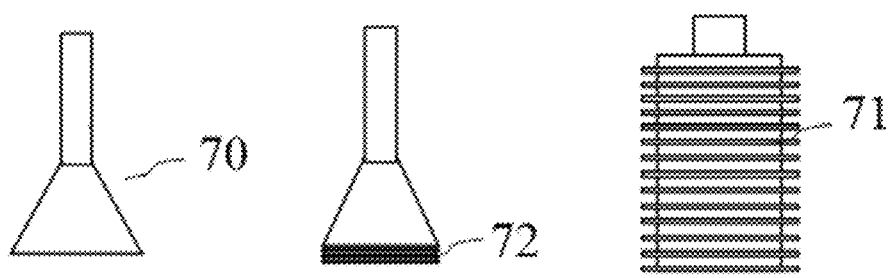
FIG. 8 is a structural schematic diagram of a spray emitter used with various embodiments of the present invention.

FIGS. 1, 5, and 8 show an example electric spraying sterilization and protein peptide bond cleavage device, which includes a feed pump 10, an electric voltage device 40, and an atomization device 30. One pole (anode or cathode) of the electric voltage device 40 connects with an electrode container 60 via a cable, while the other pole connects with the atomization device 30 via an isolation transformer 100. The atomization device 30 is provided with a liquid inlet and a liquid outlet. The liquid outlet is connected with a spray emitter, which is made of conductive materials and has an outlet for dispensing liquid into the electrode container 60, which is also made of metal material. The electrode container 60 is connected to a transfer container 80, which further connects with a discharge pump 90 by a pipe. The inside surface of the transfer container 80 is made of metal material, connecting to ground with grounding wire. The atomization device 30 has an inlet/outlet connected to a feed pump 10 through a pipe. The electric voltage device 40 is connected to an intelligent control device 50. In Example 1, the atomization device 30 is an ultrasonic atomizer, pneumatic atomizer, or electric motor atomizer. The electric voltage device sends pulsed voltage, random pulsed voltage, one-way sine wave voltage, one-way non-sinusoidal wave voltage, or DC voltage, with voltage value at approximately 20 KV. The upper end of the electrode container 60 has an opening, and the lower end has a liquid outlet, which may be provided in the form of a cylindrical electrode container 120, a conical electrode container 130, a hemispherical electrode container 140, a spherical electrode container 150, or an ellipsoidal electrode container 160, for example. The spray emitter is a trumpet type spray emitter 70, which is composed of a hollow cylinder form and a trumpet-shaped portion that is connected with a hollow cylinder. The connection point of the hollow cylinder and the trumpet-shaped portion is a closed bottom surface. There are multiple liquid outlet holes placed uniformly around the side surface of the hollow cylinder body, which are located close to the bottom surface of the closed bottom.

Example 2

FIGS. 1, 5, and 8 show an example electric spraying sterilization and protein peptide bond cleavage device, with a difference from Example 1 being that there are multiple parallel annular blade ports 72 arranged at the bottom of the trumpet-shaped portion of the trumpet type spray emitter 70.

A specific sterilization process for Example 2 and Example 3 (below) is that liquid from the feed pump 10 flows into the atomizer, goes through the liquid outlet to the inside of the hollow cylinder of the spray emitter, and then flows along the horn body of the trumpet type spray emitter while continuously being atomized. At the same time, the liquid forms numerous continuous dynamic Taylor cones at the exit end under the double effect of the electric field force. Thus, high electric field areas are formed on the surface of the Taylor cones. Bacteria passing through the high electric field areas will be fully polarized, becoming thoroughly disrupted or electroporated and ultimately killed.

Example 3

Figure 2:
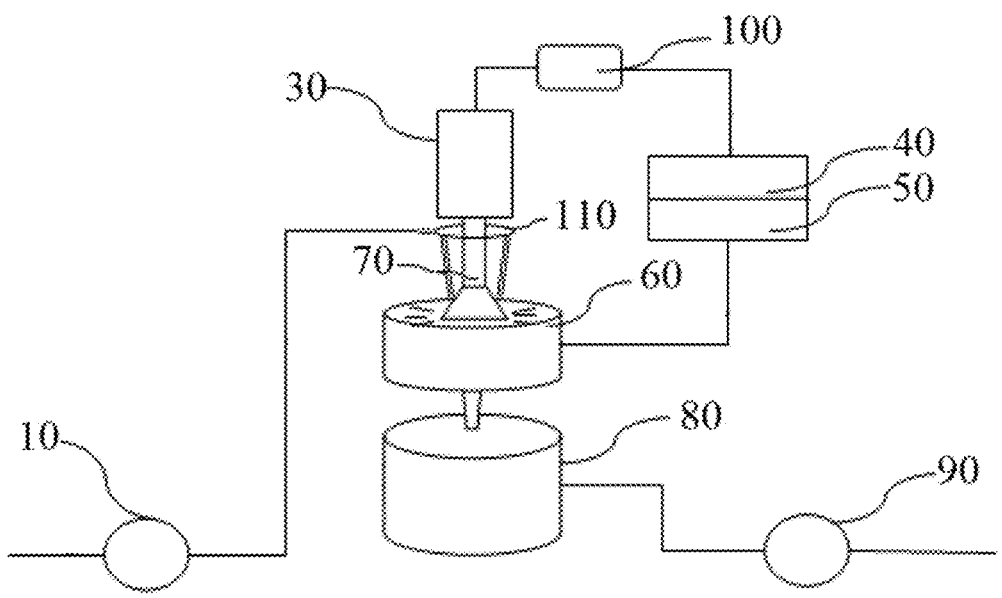
FIG. 2 is a structural schematic diagram of embodiments described in connection with Example 3.

FIGS. 2, 5, and 8 show an example electric spraying sterilization and protein peptide bond cleavage device, which includes a feed pump 10, an electric voltage device 40, and an atomization device 30. One pole (anode or cathode) of the electric voltage device 40 connects with an electrode container 60 via a cable, while the other pole connects with the atomization device 30 via an isolation transformer 100. The atomization device 30 is connected with the spray emitter, which is made of conductive materials. A multi feeder 110 is disposed outside the spray emitter. The multi feeder 110 is provided with an annular duct 111. The surface of the multi feeder 110 is arranged on water channels 112 (e.g., ten water channels), which are communicated with the annular duct 111. The water channels 112 are uniformly arranged along the circumference of the multi feeder surface, whose included angle A formed with the annular duct is 60 degrees, for example. The spray emitter is configured to dispense into the electrode container 60, which is made of metal material. The electrode container 60 is connected to a transfer container 80, which further connects with a discharge pump 90 by a pipe. The inside surface of the transfer container 80 is made of metal material, connecting to an electrical ground with grounding wire. The multi feeder 110 is connected to the feed pump 10 through a pipe. The electric voltage device 40 is connected to the intelligent control device 50. In Example 4, the atomization device 30 is an ultrasonic atomizer or a pneumatic atomizer or an electric motor atomizer. The electric voltage device sends pulsed voltage, random pulsed voltage, one-way sine wave voltage, one-way non-sinusoidal wave voltage, or DC voltage, with voltage value at 30 KV. The upper end of the electrode container 60 has an opening, while the lower end has the liquid outlet provided as a cylindrical electrode container 120, a conical electrode container 130, a hemispherical electrode container 140, a spherical electrode container 150, or an ellipsoidal electrode container 160, for example. The spray emitter is a column shaped multi-layer spray emitter 71 or a trumpet type spray emitter 70. The trumpet type spray emitter 70 is composed of a hollow cylinder form and a trumpet-shaped portion which is connected with the hollow cylinder. The column shaped multi-layer spray emitter 71 includes a cylinder which is connected with the atomization device 30, and the surface of the cylinder has a plurality of multi-layer parallel annular projections.

Example 4

FIGS. 2, 5, and 8 show an example electric spraying sterilization and protein peptide bond cleavage device, with a difference from Example 3 being that there are multiple parallel annular blade ports 72 arranged at the bottom of the trumpet-shaped portion of the trumpet type spray emitter 70.

In Examples 3 and 4, liquid can be sprayed to the surface of the spray emitter through the external multi feeder 110. Thus, the connection point of the hollow cylinder and the trumpet-shaped portion of trumpet type spray emitter 70 in Examples 3 and 4 can be provided with a closed bottom surface or not, either with or without an outlet holes.

The specific sterilization process of Example 3 or 4 is that, liquid flows through the feed pump 10 into the multi feeder 110, which goes through the water channels 112 to the surface of the spray emitter while continuously being atomized. At the same time, liquid forms numerous continuous dynamic Taylor cones at the exit end under the double effect of the electric field force. Thus, a high electric field area is formed on the surface of the Taylor cones. Bacteria passing through the high electric field area will be fully polarized, thoroughly disrupted or electroporated, and ultimately killed.

Example 5

Figure 3:
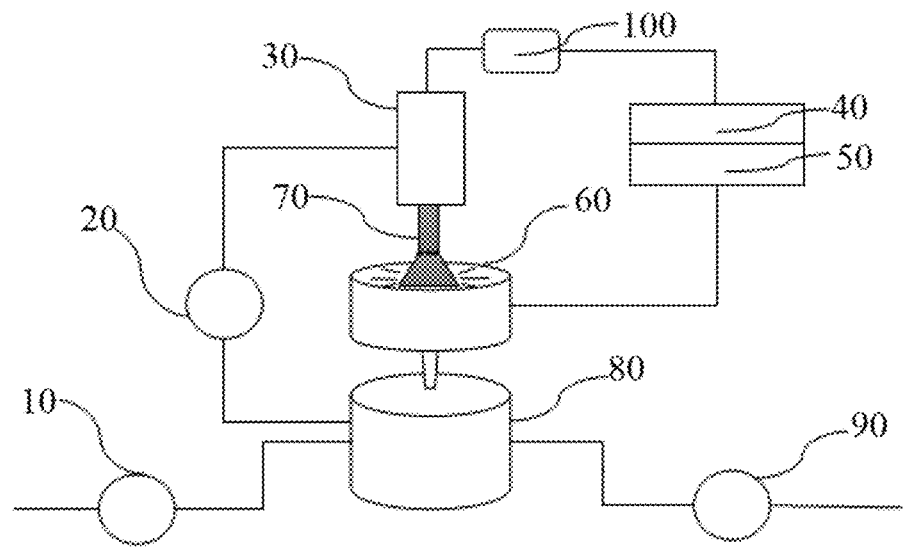
FIG. 3 is a structural schematic diagram of embodiments described in connection with Example 5.
Figure 4:
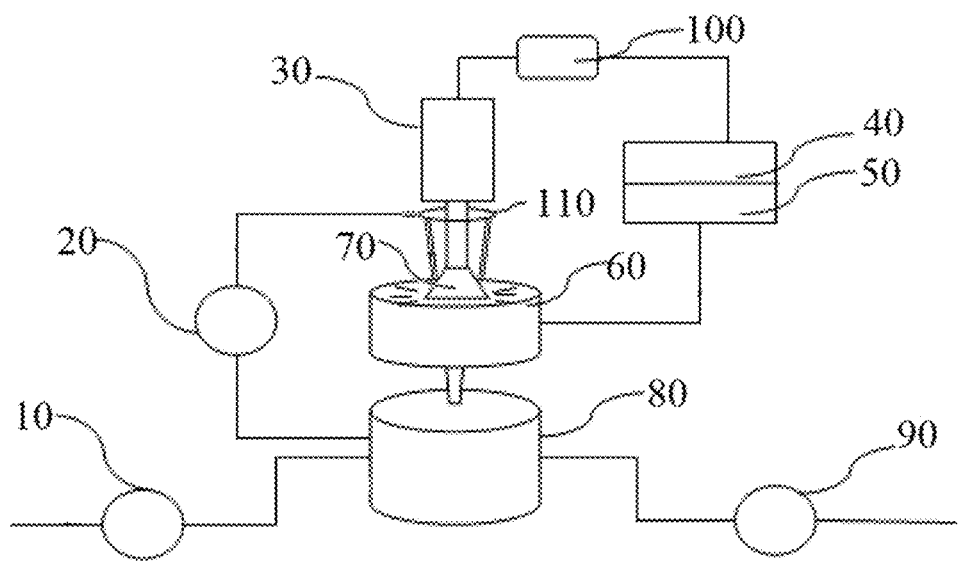
FIG. 4 is a structural schematic diagram of embodiments described in connection with Example 7.

FIGS. 3, 5, and 8 show an electric spraying sterilization and protein peptide bond cleavage device, which includes a feed pump 10, an electric voltage device 40, and an atomization device 30. One pole (anode or cathode) of the electric voltage device 40 connects with an electrode container 60 via a cable, while the other pole connects with the atomization device 30 via an isolation transformer 100. The atomization device 30 is provided with a liquid inlet and a liquid outlet, which is connected with the spray emitter. The spray emitter is made of conductive materials and has an outlet configured to dispense into the electrode container 60, which is made of metal material. The electrode container 60 is connected to a transfer container 80, which further connects with a discharge pump 90 by a pipe. The inside surface of the transfer container 80 is made of metal material, connecting to electrical ground with grounding wire. The inlet/outlet of the atomization device 30 is connected to a circulating pump 20 through a pipe. The circulating pump 20 is connected to the transfer container 80 by a pipe, and the transfer container 80 is connected to the feed pump 10 by a pipe. The electric voltage device 40 is connected with the control device 50. The intelligent control device 50 can control, as output, the time and voltage of circulating liquid for sterilization. In Example 5, the atomization device 30 is an ultrasonic atomizer, a pneumatic atomizer, or an electric motor atomizer. The electric voltage device sends pulsed voltage, random pulsed voltage, one-way sine wave voltage, one-way non-sinusoidal wave voltage, or DC voltage, with voltage values at 50 KV, for example. The upper end of the electrode container 60 has an opening, while the lower end has a liquid outlet provided in the form of a cylindrical electrode container 120, a conical electrode container 130, a hemispherical electrode container 140, a spherical electrode container 150, or an ellipsoidal electrode container 160. The spray emitter is a trumpet type spray emitter 70, which is composed of a hollow cylinder form and a trumpet-shaped portion that is connected with the hollow cylinder. The connection point of the hollow cylinder and the trumpet-shaped portion is a closed bottom surface. There are multiple liquid outlet holes uniformly spaced around the side surface of the hollow cylinder body which are located close to the bottom surface of the closed bottom.

Example 6

FIGS. 3, 5, and 8 show an electric spraying sterilization and protein peptide bond cleavage device, with the difference from Example 5 being that there are multiple parallel annular blade ports 72 arranged at the bottom of the trumpet-shaped portion of the trumpet type spray emitter 70.

The specific sterilization process of Examples 5 or 6 is that liquid from the feed pump 10 flows into the transfer container 80, then through the circulating pump 20 and into the atomization device 30. The atomization device 30 sends liquid to the inner surface of the hollow cylinder of the spray emitter. Then liquid flows along the horn body of the trumpet type spray emitter while continuously being atomized. At the same time, liquid forms numerous continuous dynamic Taylor cones at the exit end under the double effect of the electric field force. Thus, a high electric field area is formed on the surface of the Taylor cones. After bacteria become fully polarized by passing through the high electric field area, liquid flows into the transfer container to form a cycle. The intelligent control device controls the cycle time, when the cycle of sterilization is completed, and when the liquid is conveyed back to the transfer container 80, after which the sterilized liquid travels through the discharge pipe to a package via the discharge pump 90.

Example 7

FIGS. 4 to 8 show an electric spraying sterilization and protein peptide bond cleavage device, which includes a feed pump 10, an electric voltage device 40, and an atomization device 30. One pole (anode or cathode) of the electric voltage device 40 connects with an electrode container 60 via a cable, while the other pole connects with the atomization device 30 via an isolation transformer 100. The atomization device 30 is connected to the spray emitter, which is made of conductive materials. Outside of the spray emitter is disposed a multi feeder 110, which is provided with an annular duct 111. The surface of the multi feeder 110 is arranged on ten water channels 112, which are communicated with the annular duct 111. The water channels 112 are uniformly arranged along the circumference of the multi feeder surface, whose included angle A formed with the annular duct is 120 degrees. The spray emitter is configured to dispense into the electrode container 60, which is made of metal material. The electrode container 60 is connected to a transfer container 80, which further connects with a discharge pump 90 via a pipe. The inside surface of the transfer container 80 is made of metal material, connecting to electrical ground with grounding wire. The multi feeder 110 is connected to a circulating pump 20 through a pipe. The circulating pump 20 is connected to the transfer container 80 by a pipe, and the transfer container 80 is connected to the feed pump 10 by a pipe. The electric voltage device 40 is connected with the intelligent control device 50. In Example 7, the atomization device 30 is an ultrasonic atomizer, a pneumatic atomizer, or an electric motor atomizer. The electric voltage device sends pulsed voltage, random pulsed voltage, one-way sine wave voltage, one-way non-sinusoidal wave voltage, or DC voltage, with voltage value at 10 KV, for example. The upper end of the electrode container 60 has an opening, while the lower end has a liquid outlet provided as a cylindrical electrode container 120, a conical electrode container 130, a hemispherical electrode container 140, a spherical electrode container 150, or an ellipsoidal electrode container 160. The spray emitter is a column shaped multi-layer spray emitter 71 or a trumpet type spray emitter 70, which is composed of a hollow cylinder form and a trumpet-shaped portion connected to the hollow cylinder.

Example 8

FIGS. 4 to 8 show an electric spraying sterilization and protein peptide bond cleavage device, with a difference from Example 7 is that there are multiple parallel annular blade ports 72 arranged at the bottom of the trumpet-shaped portion of the trumpet type spray emitter 70.

The specific sterilization process of Examples 7 or 8 is that liquid flows through the feed pump 10 into the transfer container 80, then through the circulating pump 20 and into the multi feeder 110. Liquid then passes through the water channels 112 where it is routed to the surface of the spray emitter while continuously being atomized. At the same time, liquid forms numerous continuous dynamic Taylor cones at the exit end under the double effect of the electric field force. Thus, a high electric field area is formed on the surface of the Taylor cones. After bacteria become fully polarized by passing through the high electric field area, liquid flows into the transfer container to form a cycle. The intelligent control device controls the cycle time, when the cycle of sterilization is completed, and when the liquid is conveyed back to the transfer container 80, after which the sterilized liquid travels through the discharge pipe to a package via the discharge pump 90.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

Table of Reference Numerals:

| Ref. Number | Description |
|---|---|
| 10 | Feed pump |
| 20 | Circulating pump |
| 30 | Atomization device |
| 40 | Electric voltage device |
| 50 | Control device |
| 60 | Electrode container |
| 70 | Trumpet type spray emitter |
| 71 | Column shaped multi-layer spray emitter |
| 72 | Annular blade port |
| 80 | Transfer container |
| 90 | Discharge pump |
| 100 | Isolation transformer |
| 110 | Multi feeder |
| 111 | Annular duct |
| 112 | Water channel |
| 120 | Cylindrical electrode container |
| 130 | Conical electrode container |
| 140 | Hemispherical electrode container |
| 150 | Spherical electrode container |
| 160 | Ellipsoidal electrode container |

What is claimed is:

1. An electric spraying device, comprising:

a spray emitter made of electrically conductive material;

an electrode container made of electrically conductive material, the electrode container having an opening at an upper end thereof; and a voltage source having a first pole electrically coupled to the spray emitter and a second pole electrically coupled to the electrode container, the spray emitter having an exit end disposed at or within the opening of the electrode container, the exit end of the spray emitter having a surface configured to receive a liquid via at least one of (i) a set of holes in the spray emitter that conduct the liquid from inside the spray emitter to the surface or (ii) a multi feeder that receives the liquid and conveys the liquid to a plurality of locations on the surface, the surface having a set of projections extending therefrom, the set of projections configured to form a concentrated electric field in response to an applied voltage from the voltage source between the first pole and the second pole, and the spray emitter constructed and arranged to conduct the liquid along the surface to the set of projections, so as to polarize the liquid under the concentrated electric field and to dispense the liquid into the electrode container.

2. The electric spraying device of claim 1, wherein the spray emitter includes a cylinder having multiple blade projections extending transversely therefrom.

3. The electric spraying device of claim 1, wherein the spray emitter includes a trumpet-shaped portion having a narrow end and a wide end, with the set of projections formed at the wide end of the trumpet-shaped portion.

4. The electric spraying device of claim 3, wherein the set of projections include multiple annular blade ports projecting from the wide end of the trumpet-shaped portion.

5. The electric spraying device of claim 3,
wherein the spray emitter further includes a hollow cylinder portion having an upper end and a lower end, the upper end having an opening for receiving liquid and the lower end being closed, and
wherein the lower end of the hollow cylinder portion is connected to the narrow end of the trumpet-shaped portion and includes multiple holes, the holes constructed and arranged to conduct liquid from inside the hollow cylinder portion to outside the hollow cylinder portion, the liquid then having a path over the surface of the spray emitter to the set of projections.

6. The electric spraying device of claim 5, wherein the surface of the spray emitter has a non-stick coating.

7. The electric spraying device of claim 1, further comprising a transfer container, the transfer container having an opening configured to receive liquid from the electrode container.

8. The electric spraying device of claim 7, wherein the electrode container has a liquid outlet end configured to drain liquid into a transfer container, wherein the liquid outlet end is provided as one of (i) a cylindrical shape, (ii) a hemispherical shape, (iii) a conical shape, (iv) a spherical shape, and (v) an ellipsoidal shape.

9. The electric spraying device of claim 7, wherein the transfer container is electrically grounded.

10. The electric spraying device of claim 7, further comprising an atomization device, the atomization device having an inlet for receiving liquid and an outlet for providing atomized liquid to the spray emitter.

11. The electric spraying device of claim 10, wherein the atomization device includes one of (i) an ultrasonic atomization device, (ii) a pneumatic atomization device, or (iii) an electric motor atomization device.

12. The electric spraying device of claim 11, further comprising a circulation pump, the circulation pump coupled to the transfer container and to the atomization device and configured to pump liquid from the transfer container to the atomization device.

13. The electric spraying device of claim 11, further comprising a feed pump coupled to the transfer container and configured to provide liquid to the transfer container.

14. The electric spraying device of claim 7, further comprising a multi feeder, the multi feeder (i) disposed around the spray emitter, (ii) having an inlet configured to receive liquid, and (iii) having a set of outlets for conveying received liquid to the surface of the spray emitter.

15. The electric spraying device of claim 14,
wherein the inlet of the multi feeder includes an annular duct, and
wherein multiple water channels extend from the annular duct, the water channels providing multiple paths for liquid to travel from the annular duct to the surface of the spray emitter.

16. The electric spraying device of claim 14, further comprising a circulation pump, the circulation pump coupled to the transfer container and to the multi feeder and configured to pump liquid from the transfer container to the multi feeder.

17. The electric spraying device of claim 16, further comprising a feed pump coupled to the transfer container and configured to provide liquid to the transfer container.

18. The electric spraying device of claim 1, wherein the surface is configured to receive the liquid from a pump.

19. An electric spraying device, comprising:
a spray emitter made of electrically conductive material;
an electrode container made of electrically conductive material, the electrode container having an opening at an upper end thereof; and
a voltage source having a first pole electrically coupled to the spray emitter and a second pole electrically coupled to the electrode container,
the spray emitter having an exit end disposed at or within the opening of the electrode container, the exit end of the spray emitter having a surface configured to receive a liquid via a set of holes in the spray emitter that conduct the liquid from inside the spray emitter to the surface, the surface having a set of projections extending therefrom, the set of projections configured to form a concentrated electric field in response to an applied voltage from the voltage source between the first pole and the second pole, and
the spray emitter constructed and arranged to conduct the liquid along the surface to the set of projections, so as to polarize the liquid under the concentrated electric field and to dispense the liquid into the electrode container.

20. An electric spraying device, comprising:
a spray emitter made of electrically conductive material;
an electrode container made of electrically conductive material, the electrode container having an opening at an upper end thereof; and
a voltage source having a first pole electrically coupled to the spray emitter and a second pole electrically coupled to the electrode container,
the spray emitter having an exit end disposed at or within the opening of the electrode container, the exit end of the spray emitter having a surface configured to receive a liquid via a multi feeder that conveys the liquid to a plurality of locations on the surface, the surface having a set of projections extending therefrom, the set of projections configured to form a concentrated electric field in response to an applied voltage from the voltage source between the first pole and the second pole,
wherein the spray emitter is constructed and arranged to conduct the liquid along the surface to the set of projections, so as to polarize the liquid under the concentrated electric field and to dispense the liquid into the electrode container.

\* \* \* \* \*